(12) United States Patent
Okada et al.

(10) Patent No.: US 6,700,476 B1
(45) Date of Patent: Mar. 2, 2004

(54) ON-VEHICLE REMOTE CONTROLLER

(75) Inventors: Hiroki Okada, Toyota (JP); Misako Sugiura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/600,307

(22) PCT Filed: Jan. 14, 1999

(86) PCT No.: PCT/JP99/00101

§ 371 (c)(1),
(2), (4) Date: Jul. 14, 2000

(87) PCT Pub. No.: WO99/36296

PCT Pub. Date: Jul. 22, 1999

(30) Foreign Application Priority Data

Jan. 14, 1998 (JP) .............................................. 10-5696

(51) Int. Cl.$^7$ ........................... G05B 19/00; G06F 7/00; G08B 29/00
(52) U.S. Cl. .................... 340/5.62; 340/5.63; 340/5.72; 340/825.69; 340/5.6
(58) Field of Search ............................... 340/5.62, 5.63, 340/10.2, 5.72, 825.69, 5.61, 2.7, 825.74, 5.6, 825.72, 825.22, 5.64

(56) References Cited

U.S. PATENT DOCUMENTS

| | | | | |
|---|---|---|---|---|
| 4,794,268 A | * | 12/1988 | Nakano et al. ................ 307/10 |
| 5,144,667 A | | 9/1992 | Pogue, Jr. et al. | |
| 5,552,641 A | * | 9/1996 | Fischer et al. .............. 307/10.5 |
| 5,973,611 A | * | 10/1999 | Kulha et al. ............ 340/825.31 |
| 5,987,058 A | * | 11/1999 | Sanderford et al. .......... 375/208 |
| 6,255,944 B1 | * | 7/2001 | Addy .......................... 340/539 |

FOREIGN PATENT DOCUMENTS

| | | |
|---|---|---|
| JP | 62-201267 | 12/1987 |
| JP | 2-81875 | 6/1990 |
| JP | 2-107674 | 8/1990 |
| JP | 4-302682 | 10/1992 |
| JP | 5-106376 | 4/1993 |
| JP | 5-179852 | 7/1993 |
| JP | 9-301126 | 11/1997 |
| WO | WO 94/23163 | 10/1994 |

* cited by examiner

*Primary Examiner*—Michael Horabik
*Assistant Examiner*—Vernal U Brown
(74) *Attorney, Agent, or Firm*—Finnegan, Henderson, Farabow, Garrett & Dunner, L.L.P.

(57) ABSTRACT

A first transmitting antenna (10) transmits an ID request and a receiving antenna (18) receives a response from a portable device. The received response includes an ID, which is checked with IDs stored in a memory (28). If the checking is successful, the lock is opened by a door lock (30). Contrarily, if the checking fails several times continuously, transmission of the ID request from the first transmitting antenna (10) is suspended for a predetermined time. Thereby even if the ID request competes with the ID request from a second vehicle, the portable device can respond the ID request from the second vehicle. Transmission of an ID request is preferably inhibited by judging the request to be fraudulent when the checking fails several times continuously.

9 Claims, 17 Drawing Sheets

Fig. 3
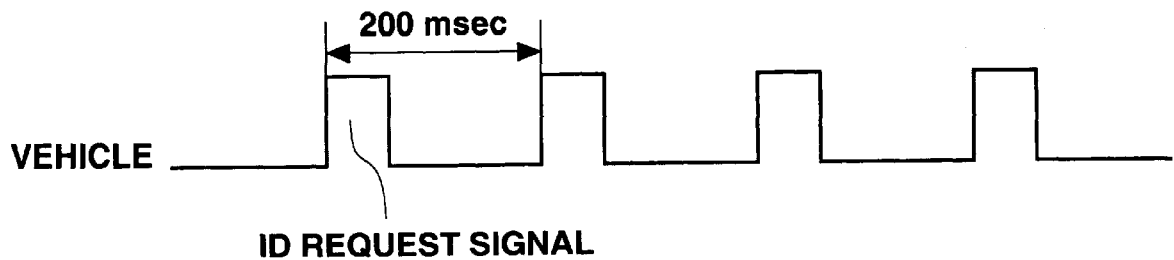
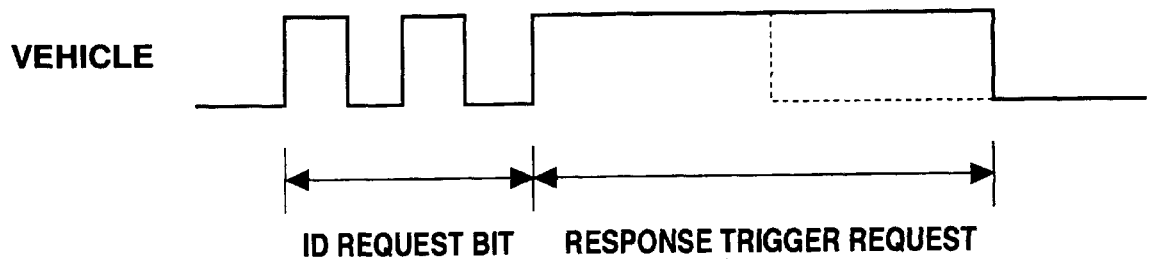
Fig. 4
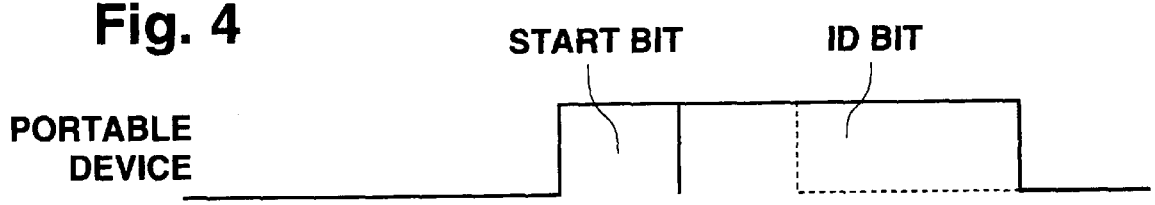
Fig. 5
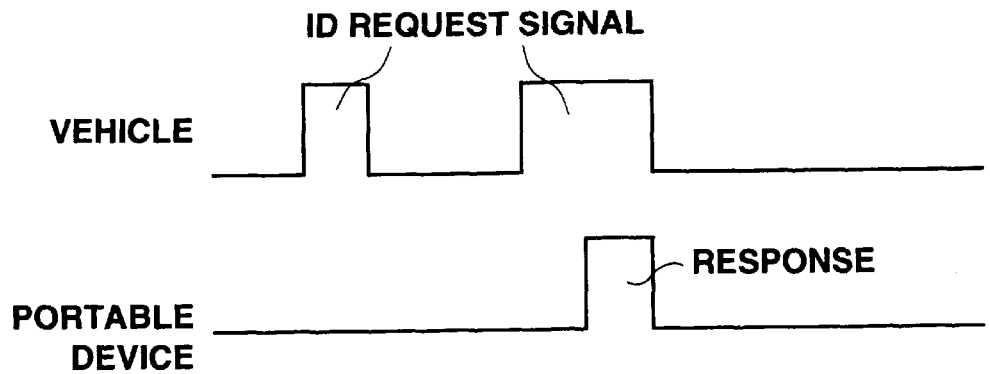

Fig. 17

| START BIT | FIXED ID BIT | FUNCTIONAL CALCULATION BIT | STATUS | PARITY, ETC |
|---|---|---|---|---|
| 10 bit | 32 bit | 32 bit | 5 bit | 5 bit |

ON-VEHICLE REMOTE CONTROLLER

TECHNICAL FIELD

The present invention relates to an on-vehicle remote controller for controlling on-vehicle devices such as a door lock based on communication with a portable device.

BACKGROUND ART

Conventionally, various types of remote control devices are used, and a system known as a keyless entry system is widely used for releasing the door lock of a vehicle. With the keyless entry system, by operating on a portable device, an electric wave signal is transmitted from the portable device, which is then received at a vehicle-side receiver. Then, if an ID included in the received signal matches with an ID stored at the vehicle, the vehicle judges that the operation on the portable device is a proper operation and the door lock is released.

However, in this system, a user must take out and operate on the portable device. To avoid this operation, a smart entry system has been proposed. In the smart entry system, an ID request signal is transmitted from the vehicle and the portable device transmits an ID when it receives the ID request signal. In this manner, the door lock can be released without any operation on the portable device by the user.

The ID request signal can be transmitted from the vehicle in a number of ways, including a method for transmitting the ID request signal when a user operates a door outer handle and a method for transmitting the ID request signals constantly, with a predetermined interval in between, when the user is away from the vehicle. The method for transmitting an ID request signal when the door outer handle is operated has an advantage that the battery consumption can be reduced, but can result in a delay in releasing the door lock, and thus, the method of constantly transmitting ID request signals with a predetermined interval in between is preferred.

In the system for periodically transmitting an ID request signal as described above, there are cases where interference occurs and sufficient communication cannot be obtained. For example, if a plurality of portable devices approach a vehicle, a plurality of IDs are simultaneously transmitted from the portable devices, resulting in the vehicle being incapable of receiving the ID, and remote operation cannot be performed even when one of the portable devices is the proper portable device. Moreover, when two vehicles are close together, ID requests are transmitted from both vehicles. In this case, when an ID request is transmitted from a second vehicle, the portable device is in the process of responding to the ID request transmitted from the first vehicle, and thus, is unable to respond to the ID request from the second vehicle. If the second vehicle is the vehicle corresponding to the portable device, because the portable device always responds to a vehicle which transmits the ID request signal first, the portable device does not respond to the second vehicle, and the vehicle corresponding to the portable device cannot be remotely operated.

A system for transmitting an ID request signal when the door outer handle is operated is described in, for example, U.S. Pat. No. 5,552,641. Specifically, the '641 patent describes coding the ID request signal and transmitting the coded signal, but this coding is not for preventing an interference from a plurality of vehicles. Moreover, if the ID request signal is coded by a complicated coding method, circuits for coding and decoding for this purpose must be provided, resulting in a complicated and/or expensive device.

DISCLOSURE OF INVENTION

One object of the present invention is to provide an on-vehicle remote operation control device which can reliably remote operate an on-vehicle device even when a plurality of vehicles and/or portable devices exist in an area.

Another object of the present invention is to effectively prevent remote operation by fraudulent communication.

According to one aspect of the present invention, there is provided an on-vehicle device remote controller for mounting on a vehicle and for controlling a predetermined on-vehicle device based on communication with a portable device, the remote controller comprising: an ID request signal transmitting device for intermittently transmitting an ID request signal to a portable device in a predetermined interval; ID receiving means for receiving an ID signal from the portable device; checking means for checking the ID received by the ID receiving means with a predetermined proper ID; and device operation control means for operating the predetermined on-vehicle device when the checking is successful at the checking means; wherein the transmission of ID request signal is controlled to be inhibited when the checking has failed at the checking means.

When one portable device receives ID request signals from two vehicles, it responds to the first received ID request signal. If the portable device is not the device corresponding to the vehicle to which the device responded, ID checking fails. In this case, the vehicle where the ID checking failed is controlled to inhibit the generation of ID request signals. In this manner, the portable device can respond to an ID request signal from the second vehicle and can remotely operate on the second vehicle. Moreover, because the ID request signal is inhibited, the device can discourage attempts at fraudulent communication.

It is preferable that the checking means include comparison means for comparing the received ID and the proper ID from the beginning of the received ID while the ID is being received by the ID receiving means.

The ID from the portable device is transmitted as a response to the ID request signal from the vehicle. Therefore, the vehicle knows the beginning of the received ID and can compare it with the stored ID bit-by-bit while the ID is being received. When a difference is detected, the communication can be terminated at that point, thus reducing the electric wave traffic and the power consumption.

A failure of checking at the checking means is preferably detected after at least a few failures are detected in the received ID. Because one detection of difference may be due to a burst error, if transmission of ID request signal is inhibited immediately after one failure detection, an unnecessary delay tends to occur. By inhibiting the transmission of the ID request signals based on a plurality of differences detected, such an erroneous decision can be prevented.

It is preferable for the ID request signal transmitting means to increase the transmitting level of the ID request signal when a predetermined manual operation is performed by a user after transmission of the ID request signal is inhibited.

When the door outer handle is operated or when a wireless code is transmitted from a portable device, it is obvious that the user will operate on the vehicle, and reliable communication can be performed in such cases by increasing the transmitting level of the electric wave.

The inhibition of the transmission of the ID request signal is preferably performed by decreasing the transmission level of the ID request signal, so that the portable device can receive other ID request signals. By suspending transmission of the ID request signals, attempts at fraudulent communication can be restricted.

It is preferable to inhibit transmission of the ID request signal by elongating the period between the intermittently transmitting ID request signals. By changing the length of the period between transmissions, collision of the electric waves can be easily and reliably avoided.

According to another aspect of the present invention, there is provided an on-vehicle device remote controller mounted on a vehicle for controlling operation of a predetermined on-vehicle device based on communication with a portable device, the controller comprising: ID request signal transmitting means for intermittently transmitting ID request signals to a portable device at a predetermined interval; ID receiving means for receiving an ID signal from the portable device; checking means for checking the ID received by the ID receiving means with a predetermined proper ID; and device operation control means for operating a predetermined on-vehicle device when checking is successful at the checking means; wherein the transmitting interval of the ID request signal at the checking means can be sequentially changed in a predetermined manner.

By changing the transmitting interval of the ID request signal, continuous collisions between the ID request signals from a plurality of vehicles can be effectively prevented.

It is also preferable to change the transmitting interval of the ID request signals from the checking means every time an ID request signal is transmitted.

It is preferable that the ID request signal transmitting means transmits a car number assigned to each vehicle and further transmits an ID request signal when a response to the car number and the checking means confirms checking of the proper ID by determining that a response code in the response from the portable device generated for the challenge code is generated in a predetermined manner based on the challenge code.

In this manner, communication specifying the key for the vehicle can be performed, and by using a challenge code, communication which is difficult to crack can be performed.

It is also preferable that the checking means confirms checking by determining a fixed code for specifying a preregistered portable device is included in the response from the portable device for the challenge code.

The portable device can be specified by the fixed code and can be confirmed. Moreover, the control of the on-vehicle device itself can be changed using the portable device.

It is also preferable that the checking means detects a condition where the fixed code from the portable device is proper but the response code is not, and that the checking means determines failure of checking after a plurality of such conditions are detected.

In this manner, attempts at fraudulent communication can reliably be detected.

It is also preferable that the on-vehicle device controller further comprises display means for displaying the checking failure when the checking has failed.

BRIEF DESCRIPTION OF DRAWINGS

FIG. 3 is a chart showing timing of ID request signals.

FIG. 4 is a chart showing timing of a response signal from a portable device.

FIG. 5 is a chart showing timing of communication between a vehicle and a portable device.

FIG. 17 is a diagram showing a format for a response code.

BEST MODE FOR CARRYING OUT THE INVENTION

Figure 1:
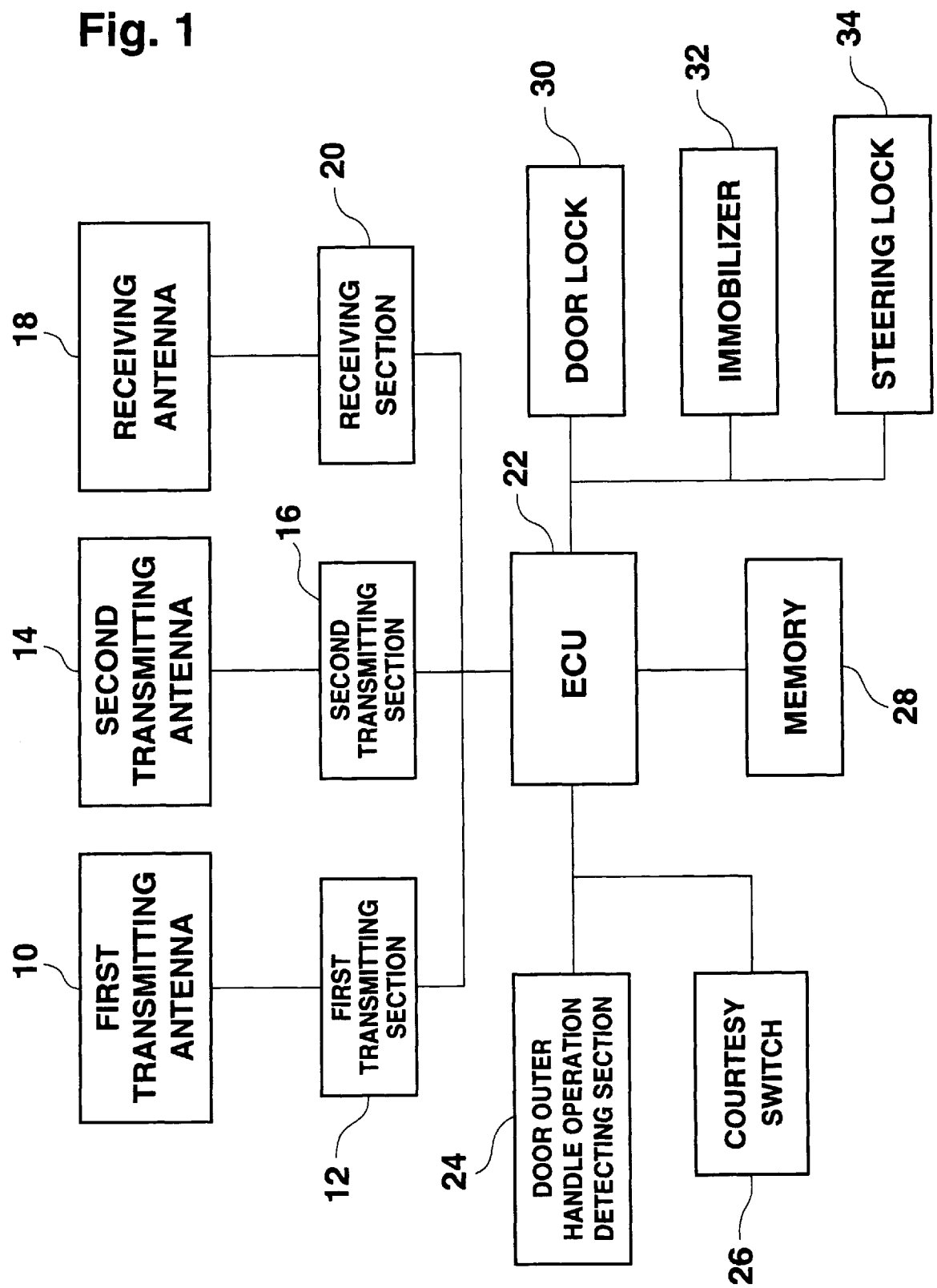
FIG. 1 is a block diagram showing a structure of a device according to a first embodiment.

Preferred embodiments of the present invention are now described referring to the drawings.

(First Embodiment)

FIG. 1 is a block diagram showing an overall structure of the first embodiment. A first transmitting antenna 10 is provided, for example, in a outer door handle provided on the outside of the driver side (D-side) door. The fist transmitting antenna 10 transmits an electric wave having a relatively high directionality, for example, an electric wave of 2.45 GHz, to transmit an ID request signal from the vehicle. A first transmitting section 12 performs processes for transmitting ID request signals from the first transmitting antenna 10. A second transmitting antenna 14 is provided near the inner panel inside the vehicle, and transmits an ID request signal to the interior of the vehicle using an electric wave of, for example, 2.45 GHz. A second transmitting section 16 performs processes for transmitting ID request signals from the second transmitting antenna 14. A single circuit can also be used to perform functions of both the first 12 and second 16 transmitting sections.

A receiving antenna 18 is provided inside the car (for example, near the rear view mirror) and receives signals transmitted from a portable device. The signal from the portable device is, for example, a 300 MHz signal and is a response including an ID to the ID request signal. A receiving section 20 performs processes for the signals received at the receiving antenna 18.

The first 12 and second 16 transmitting sections and the receiving section 20 are connected to an ECU 22. The ECU 22 controls the first 12 and second 16 transmitting sections and the receiving section 20, and at the same time, executes various other types of processes.

A door outer handle operation detecting section 24 and a courtesy switch 26 are connected to the ECU 22. The door outer handle is a handle for opening the D-side door from the outside. The door outer handle operation detecting section 24 detects when the D-side door outer handle is operated. The courtesy switch 26 is a switch that turns on and off with the door opening and closing, and in this case, indicates opening/closing of the D-side door. Thus, the ECU 22 can recognize the operation of the D-side door outer handle and the opening/closing of the D-side door.

A memory 28 is also connected to the ECU 22. The memory 28 stores data about the portable device ID. Thus, the ECU 22 reads an ID already stored in the memory 28 (stored ID) and performs ID checking by comparing the stored ID with an ID received from the portable device (received ID). As the memory 28, a non-volatile memory is preferable, and for example, an EEPROM is used. If the memory 28 is an EEPROM, the content of the memory 28 can be overwritten whenever necessary. It is also preferable to store separate IDs for door locking/releasing and for releasing the immobilizer and steering lock in the memory 28.

A door lock 30, an immobilizer 32, and a steering lock 34 are also connected to the ECU 22. The door lock 30 is for controlling door lock/release operation and performs door locking/releasing by driving a lock mechanism by driving a motor, etc. It is preferable that the door lock 30 can control lock/release operations of all the doors and an individual door in addition to the D-side door. The door lock 30 is controlled based on the response from the portable device to the ID request from the first transmitting antenna 10.

The immobilizer 32 controls permission/denial of engine starting. When possession of a proper portable device is confirmed through the ID exchange with the portable device, the immobilizer 32 permits start of the engine. The steering lock 34 is for locking steering and releases the steering lock when a proper portable device is recognized, similar to the immobilizer 32. The immobilizer 32 and the steering lock 34 are controlled based on the response from the portable device to the ID request from the second transmitting antenna 14.

Figure 2:
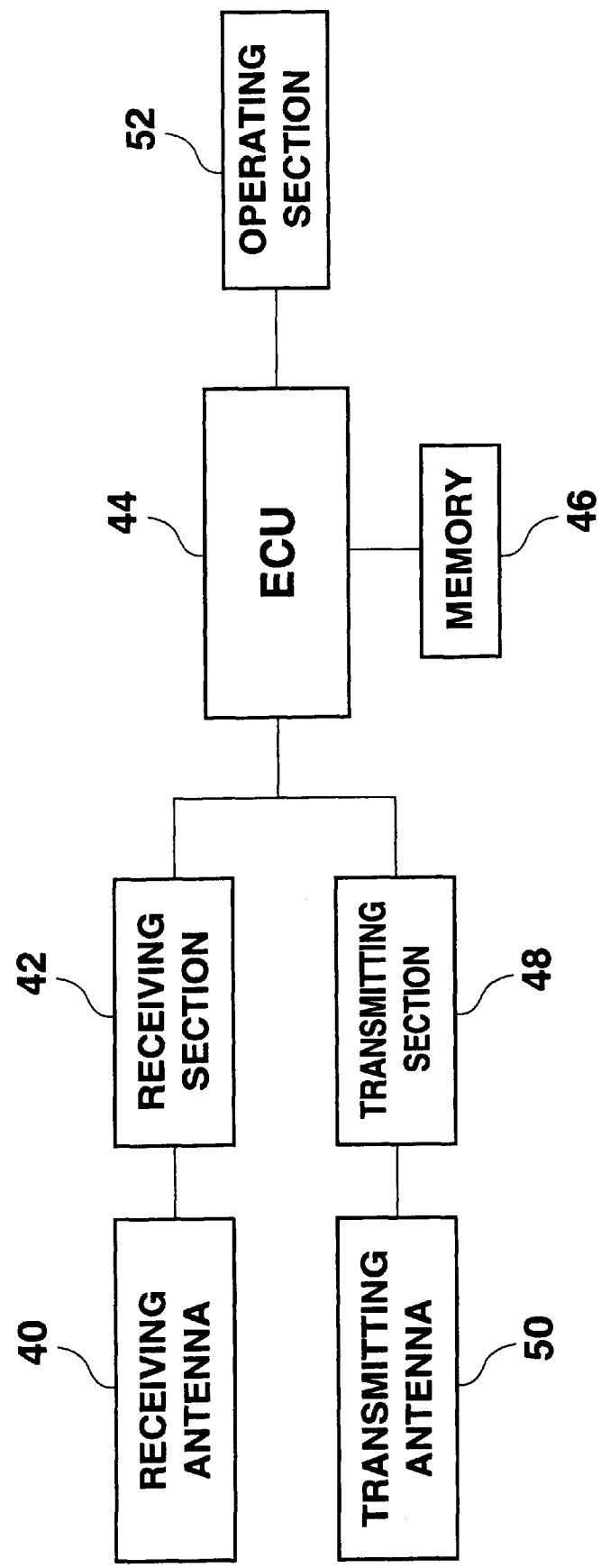
FIG. 2 is a block diagram showing a structure of a portable device.

FIG. 2 shows a structure of a portable device. A receiving antenna 40 receives an electric wave of 2.45 GHz (ID request signal) transmitted from the first 10 and second 14 transmitting antennas at the vehicle. A receiving section 42 is connected to the receiving antenna 40 and performs reception processes for the signal received at the receiving antenna 40. An ECU 44 is connected to the receiving section 42 and performs various processes including the signal supplied from the receiving section 42. A memory 46 is connected to the ECU 44 and stores data about IDs. The memory 46 stores, for example, two types of IDs, one for releasing the door lock and the other for releasing the immobilizer and steering lock. The memory 46 is formed from, for example, a ROM, but can also be formed from an EEPROM and be overwritable. A transmitting antenna 50 is connected to the ECU 44 via a transmitting section 48 and transmits a predetermined carrier modulated by ID data. The carrier frequency is, for example, 300 MHz, and the carrier is received the receiving antenna 18 at the vehicle. Furthermore, an operating section 52 is connected to the ECU 44 and the ID can be transmitted by operating on the operating section 52, even when no ID request signal is received.

"ID Request Signal"

In a system comprising the on-vehicle device and portable device as explained, when the user turns the engine off, locks the door, and walks away, the on-vehicle device transmits ID request signals from the first transmitting antenna 10 in a predetermined time interval. For example, as shown in FIG. 3, the ID request signals are continuously transmitted with a 200 msec interval.

Here, the ID request signal can be a signal maintaining a state of "1", but in the present embodiment, the ID request signal is constructed from an ID request bit and a response trigger request as shown in FIG. 3, the ID request bit being a code signal indicating the ID of the ID request signal itself and the response trigger request maintaining a state of "1" after the ID request bit. The ID request bit includes a plurality of bits and an ID request signal can be identified by the ID request bit. An ID request bit is assigned to each portable device so that the portable device only responds to ID request signals having the ID request bit for the portable device.

The response trigger request is a signal indicating that the on-vehicle device is waiting for response from a portable device.

Thus, if no response is received after a predetermined period of time, the trigger request is returned to a state "0". If, on the other hand, a response is received, a state of "1" is maintained throughout ID checking. The dotted line in the figure shows a case of a failure in ID checking and the solid line in the figure shows a case of a success in ID checking.

A predetermined start bit can also be added before or after the ID request bit.

In the example shown in the figure, the ID request is shown to include 4 bits for reasons of simplicity, but it is preferable that the ID request include 8 bits. In this manner, $2^8=256$ IDs can be set. By assigning any one ID for each portable device, the probability of portable devices having the same ID request bit when N portable devices are present in one area becomes N/256 for a case of 8 bits, which is a small probability.

The above-mentioned probability can be reduced further by increasing the number of bits for the ID request bit, but this change would complicate the reception decision circuit at the portable device, increase the electric current consumption, and increase the battery attrition. It is therefore preferable to set the number of bits at 8. The portable device can store the data about the ID request bit for the portable device in the memory 46.

"Timing Chart"

A timing chart is shown in FIG. 5 for a case when a portable device approaches and enters a reception area. When the portable device receives an ID request signal and recognizes that the ID request bit is for the portable device, the ECU 44 reads the ID for the portable device from the memory 46 and transmits the ID from the transmitting antenna 50 as a response.

This response is formed by, as shown in FIG. 4, a start bit and an ID bit. The start bit is merely for notifying that an ID bit is transmitted, and the ID bit is data based on the information about the ID stored in the portable device.

The response from the portable device is received by the receiving antenna 18 at the vehicle. In the example shown in the figure, the portable device responds to the second ID request signal. In this manner, the vehicle side continues to transmit the response trigger request.

The ECU 22 then checks the received ID with the ID read from the memory 28. While checking is performed on the response ID, the response trigger request continues to be at the state "1". When the checking is successful (when IDs match), the response trigger is returned to the state "0" at that point. When ID checking fails (when the IDs do not match), the response trigger returns to the state "0" at that point. If the ID checking is successful (IDs match), the ECU 22 controls the door lock 30 to release the door lock 30.

"ID Checking"

Checking between the received ID and the stored ID at the vehicle is performed sequentially, bit-by-bit. Specifically, the portable device receives an ID request bit and returns a response when it recognizes that the ID request signal is for the portable device. Thus, the timing for response reception is known at the vehicle side and the signal from the portable device can sequentially be taken in from the start bit. Therefore, ID checking can be performed bit-by-bit from the first bit.

As described above, the checking is performed on the received data at the vehicle after synchronization. It is also preferable to synchronize bit-by-bit based on the received start bit. The synchronization can also be performed at the portable device upon transmission based on the ID request bit.

As described by a dotted line in FIG. 3, when the ID checking fails in the middle of the checking process, the response trigger request is returned to a state of "0" at that point. When the response trigger request becomes "0", the portable device, as shown by dotted line in FIG. 4, stops transmission of the ID bit. In this manner, unnecessary communication can be terminated at an early stage, and the electric wave traffic can be reduced. Moreover, the electric power consumption can also be reduced.

"Operation Flow"

Figure 6:
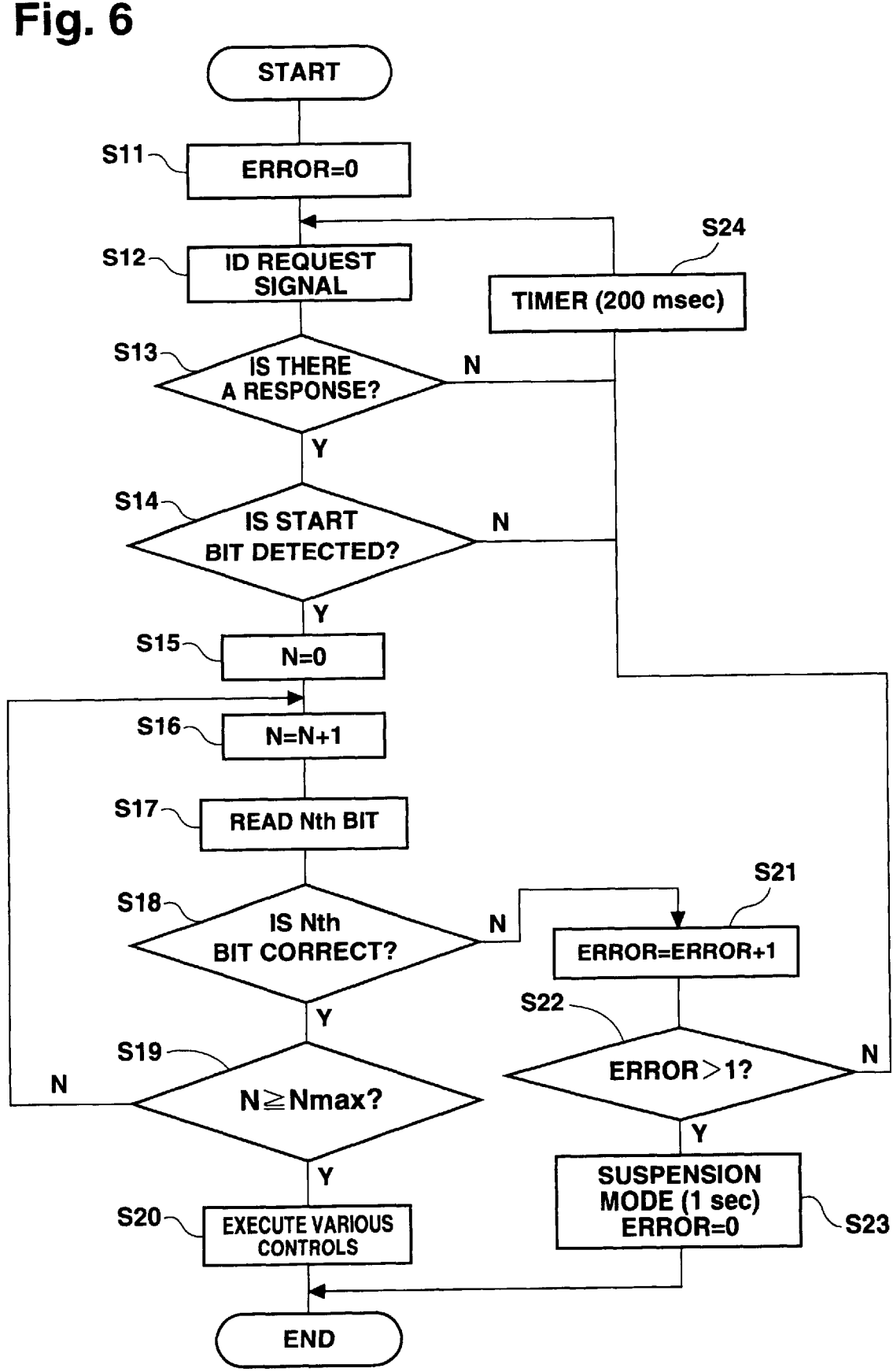
FIG. 6 is a flowchart showing processes at a vehicle.

The operation at the vehicle side is described next referring to the flowchart of FIG. 6. First, a variable, Error, is set to 0 (step S11) and an ID request signal is transmitted (step S12). Then it is determined if there is a response from a portable device (step S13). If there is a response, it is determined if the start bit is detected (step S14). When start detection is confirmed at this determination, a variable, N, representing the bit number of the ID bit is set to 0 (step S15) and is increased by 1 (step S16). Then the Nth bit data of the received ID is read (step S17), and read Nth bit data is compared with the Nth bit data of the stored ID to determine if the Nth bit data is correct (step S18). When it is determined that the Nth bit data is correct at this determination, it is determined if the variable N is greater than or equal to Nmax, the maximum bit number (step S19). When the variable N has not reached the maximum value, the procedure returns to step S16 and continues to check the IDs bit-by-bit. When the determination is "YES" in step S19, the IDs completely match and remote control such as releasing the door lock, etc. is executed (step S20).

If the determination at step S18 is "NO", it means that ID checking failed, and the variable Error is incremented by 1 (step S21). Then it is determined if the variable Error is greater than 1 (step S22) and if it is, an ID request suspension mode is activated to suspend generation of the ID request signals for a predetermined period, for example, 1 second. The variable Error is returned to 0 (step S23). If, on the other hand, the determination at step S22 is "NO", the procedure returns to step S12 and continues the operation of the ID checking of the ID request signal. As described, the ID checking is confirmed bit-by-bit, and the ID checking process is suspended when ID checking failed for an ID bit.

If the determinations at steps S13 and S14 are "NO", it means that the device failed to receive the response signal. Thus, after the timer for measuring the transmitting interval counts 200 msec (step S24), the process jumps back to step S12. When the determination at step S22 is "NO" and it is the first time of checking failure occurrence, the process jumps to step S24, waits 200 msec, and jumps back to step S12.

In this manner, the present embodiment provides a suspension mode for ID request at step S23. Thus, even when ID request signals from two vehicles interfere with each other, ID checking can still be performed.

Figure 7:
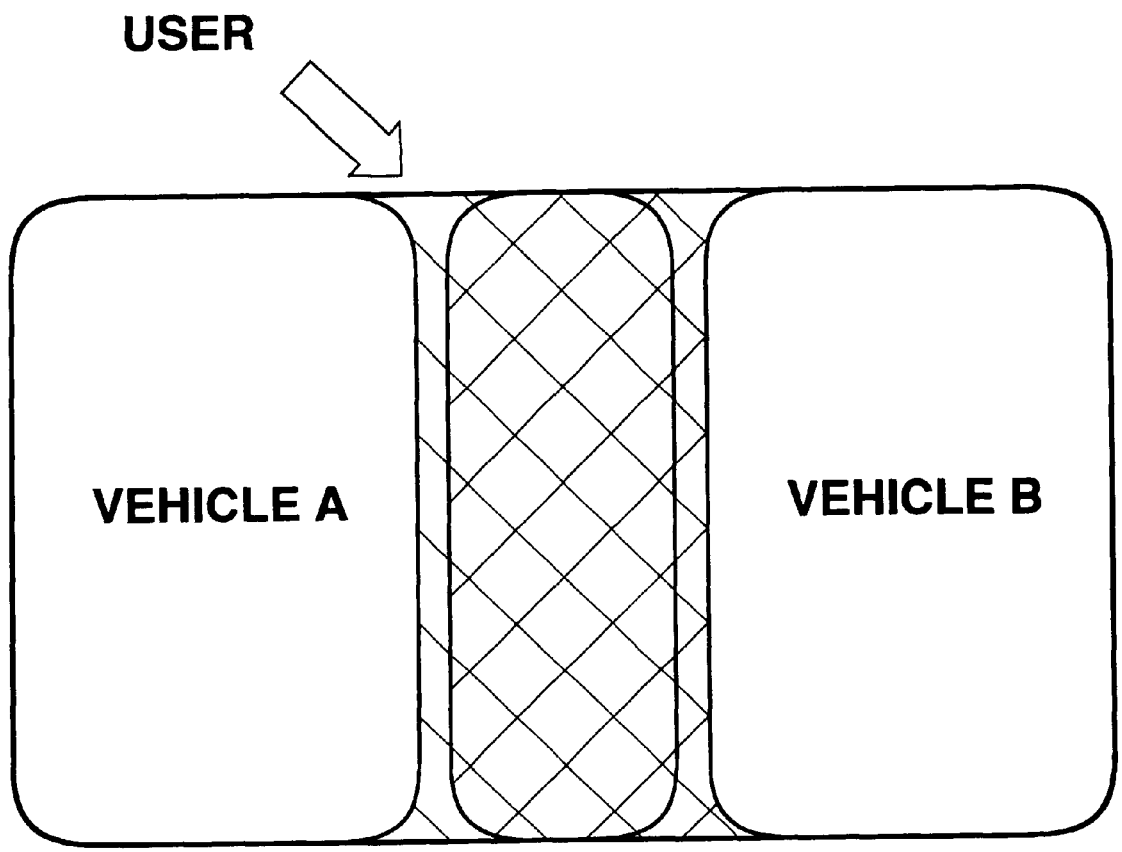
FIG. 7 is a diagram showing a condition when two vehicles are adjacent to each other.
Figure 8:
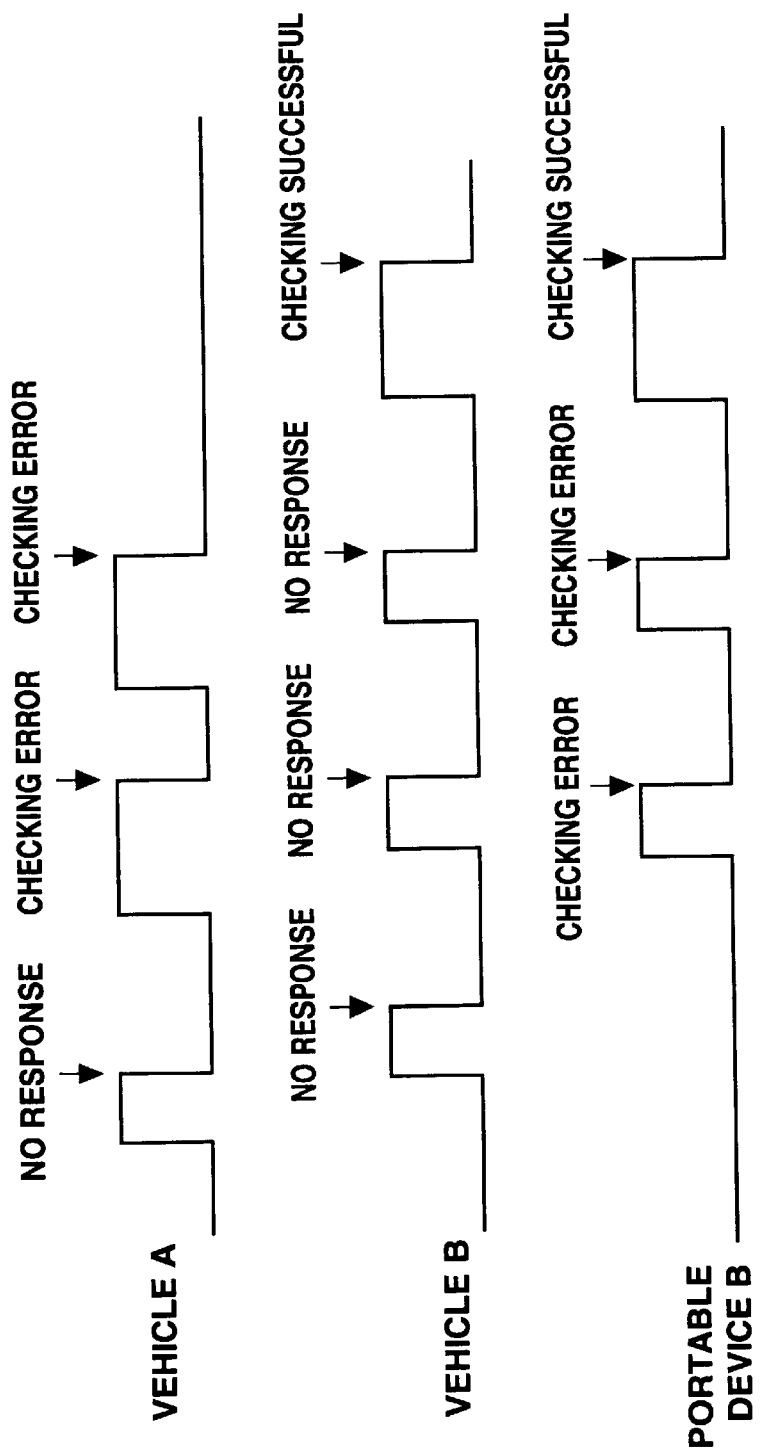
FIG. 8 is a chart showing timing of communication between two vehicles and one portable device.

In other words, as shown in FIG. 7, when a portable device B for a vehicle B is present at a place where the portable device B can receive ID request signals from both vehicles A and B, and when the portable device B can respond to both of the vehicles A and B (that is, relatively simple request IDS matched), if the transmitting timing of the ID request signals from the vehicles A and B are such that the ID request signal from vehicle A reaches the portable device B first, as shown in FIG. 8, the portable device B responds to the ID request signal from vehicle A. In this case, when vehicle B tries to detect a response from the portable device B, the portable device B is in the process of responding to the vehicle A and therefore, no start bit can be detected at the vehicle B. At vehicle A, on the other hand, the response from the portable device B fails checking due to ID difference.

If there is no suspension period, the request signals from vehicles A and B will continue to be transmitted at the same timing, and the portable device responds to vehicle A at the same timing. Thus, no ID checking will take place at vehicle B for the portable device B, and no remote operation can be performed at vehicle B.

However, in the present embodiment, a suspension period is provided for vehicle A with ID checking failure after detecting the start bit and the transmission of the ID request signals is controlled to be inhibited. Thus, during this suspension period, an ID request signal is transmitted from the vehicle B to which the portable device B can and will respond. In this manner, ID checking succeeds at vehicle B and remote operations such as release of the door lock can be performed.

When the start bit is not detected at step S14, the procedure jumps to step S24 where 200 msec elapses and the procedure returns to step S12 for transmitting an ID request signal. In other words, when a response is received at the vehicle B for the first ID request signal but the start bit is not detected, vehicle B receives the response from the middle. In such cases, it is determined that communication is not properly performed, no suspension period is inserted, and an ID request signal is transmitted after 200 msec has elapsed. In this manner, response from the portable device B can be received at vehicle B on the next timing and IDs can be checked.

Moreover, in step S22, the suspension mode is activated only after more than one continuous error is detected. This feature is provided to take into consideration a case where a proper ID is received but error occurs due to communication errors by burst noise etc. In other words, if the determination is performed after a single error is detected, the suspension mode is activated at such cases and response delay tends to be generated. However, by activating the suspension mode upon the generation of two errors at the ID checking after the start bit has been detected, such activation of suspension mode by a communication error can be prevented.

In the above example, the period of the intermittently transmitted ID request signal was elongated to remove operational disadvantages due to the electric wave interference. However, it is also possible to inhibit the transmission of the request signal by reducing the transmission level of the ID request signal instead of elongation of the waiting period. By reducing the transmitting level, it becomes more difficult, if not impossible, for the ID request signal to reach the portable device, and thus, it becomes easier for other ID request signals to be received by the portable device.

"Process Corresponding to the Operation of the Door Outer Handle"

In a parking lot with a plurality of vehicles and portable devices present and where many exchanges of these vehicles and portable devices take place, the electric wave traffic tends to be high and it is more difficult for normal communication to be performed. In the present embodiment, the controller is provided with a door outer handle operation detecting section 24. When an operation is detected at the door outer handle operation detecting section 24, the ECU 22 controls the first transmitting section 12 to perform the following processes:

(a) immediately transmit an ID request signal;
(b) shorten the repeating interval for the ID request signals; and
(c) increase the signal level of the ID request signals.

In this manner, when a user having a proper portable device operates on the door outer handle, IDs can be checked. The door outer handle operation detecting section 24 can detect the actual operation of the door outer handle or can detect touching or approaching by a human hand.

It is also preferable to stop the above-mentioned periodic transmission of the ID request signal depending on the battery condition of the vehicle and transmit the ID request signal only when the outer door handle is operated.

"Changing the Transmitting Interval"

In the example mentioned above, the transmission interval for the ID request signal from the vehicle is constant, but it is also possible to change the transmission interval in a predetermined manner to prevent interference between ID request signals from two vehicles.

Figure 9:
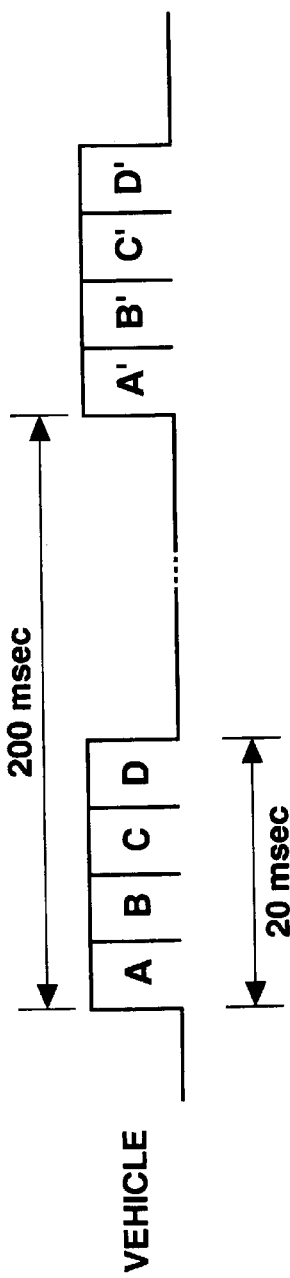
FIG. 9 is a chart showing timing of an example where the transmitting interval of ID request signals is changed.

For example, as shown in FIG. 9, a plurality of slots (4 slots A, B, C, and D for the example shown in the figure) are prepared for assigning the ID request signal. The slot in which the ID request signal is transmitted is changed every time. In this manner, the timing for which the ID request signal is transmitted changes randomly.

Specifically, the ID request signal is generated, for example, every 200 msec, and 5 msec is required for transmitting one ID request signal. In this case, 4 slots A, B, C, and D are prepared for generating an ID request, which amounts to a total of 20 msec. One slot among the 4 slots is randomly selected to transmit the ID request signal.

In this manner, even when the ID request timings for two adjacent vehicles match by coincidence, the probability that the next timings for generating the ID request match is 1/4. Thus, it becomes very unlikely for the ID request signals to continuously coincide. If the number of slots is N, the probability of the next transmission coinciding is 1/N.

Figure 10:
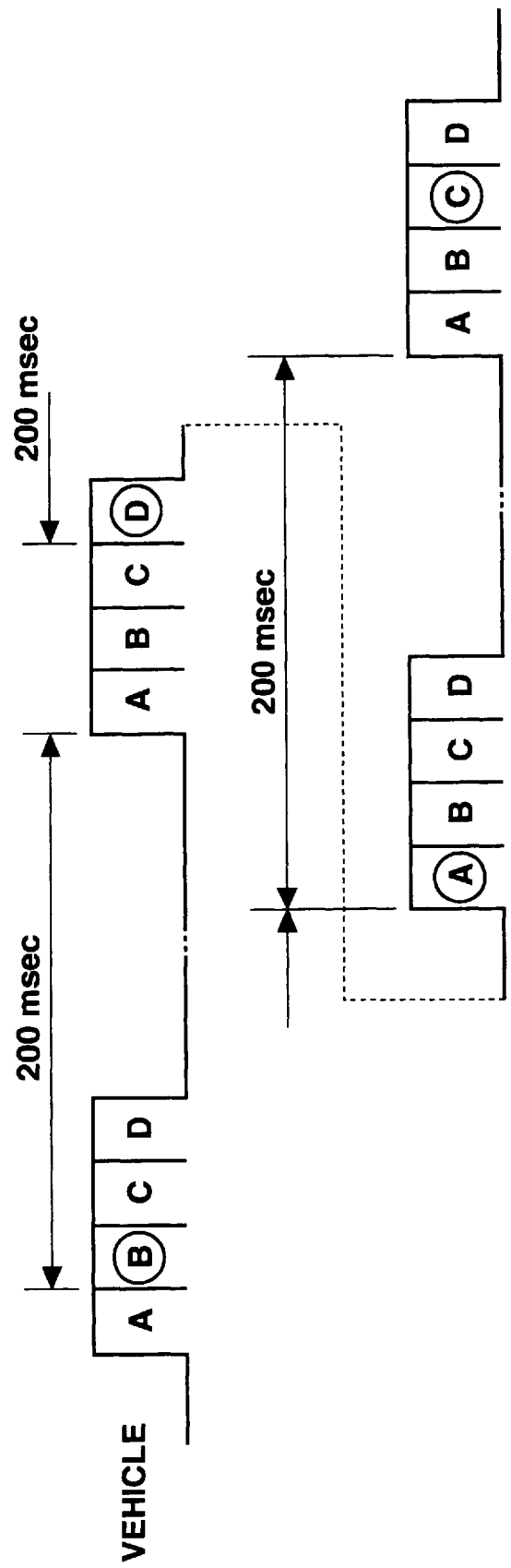
FIG. 10 is a chart showing timing of another example where the transmitting interval of ID request signals is changed.

FIG. 10 shows another example where the timing for starting the measurement for the interval itself is changed. Specifically, when the transmission of the ID request signal is started, the measurement of 200 msec transmitting interval is started, and slot A is assigned when 200 msec is elapsed. In the example shown in the figure, slot D is selected after selection of slot B, and the interval between the slot A and next slot A becomes 205 msec. Similarly, because slot A is selected after slot D, the interval between the slot A and next slot A becomes 215 msec. In this manner, by changing the position of slot A, the collision probability can be further reduced.

It is also possible to prepare a plurality of transmitting intervals and assign one transmitting interval to a vehicle. By preparing N transmitting intervals and assigning one for each vehicle, the probability transmitting intervals from adjacent vehicles matching can be reduced to 1/N. Thus, the probability of the ID request bits and the transmitting intervals both matching will be very low.

"Provision for a Plurality of Portable Devices"

There is a demand for registering and using a plurality of portable devices for one vehicle. For example, two portable devices a and b are used for remote controlling one vehicle.

(i) In this case, if the same ID request bit is assigned to both of the portable devices a and b, and when the user possesses the two portable devices (for example, one is used as a backup), both portable devices return a response, and electric wave interference will be generated.

There is thus a need to assign separate ID request bits when two portable devices a and b are registered.

Figure 11:
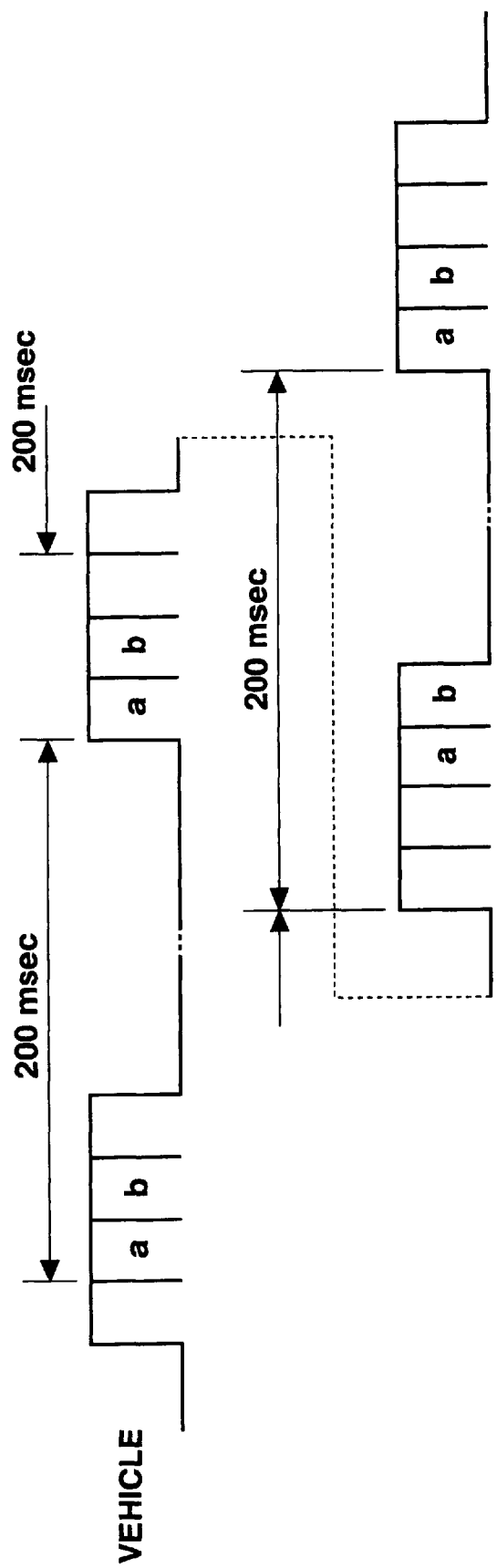
FIG. 11 is a chart showing timing of an example where an ID request signal is transmitted to a plurality of portable devices.

In order to address the problem mentioned above, 4 slots are provided for ID request signal in the example, as shown in FIG. 11, and ID request signals for the portable devices a and b (respectively labeled a and b in the figure) are assigned to different slots.

In other words, the ID request bits a and b are always assigned to different slots, such as a assigned to the second slot and b assigned to the third slot in the first ID request signal, and a assigned to the first slot and b assigned to the second slot in the next ID request signal.

In this manner, the portable devices a and b can always return responses at a different timing. Thus, the electric wave interference between the responses from the two portable devices that causes the vehicle-side device to be incapable of receiving can be prevented.

Figure 12:
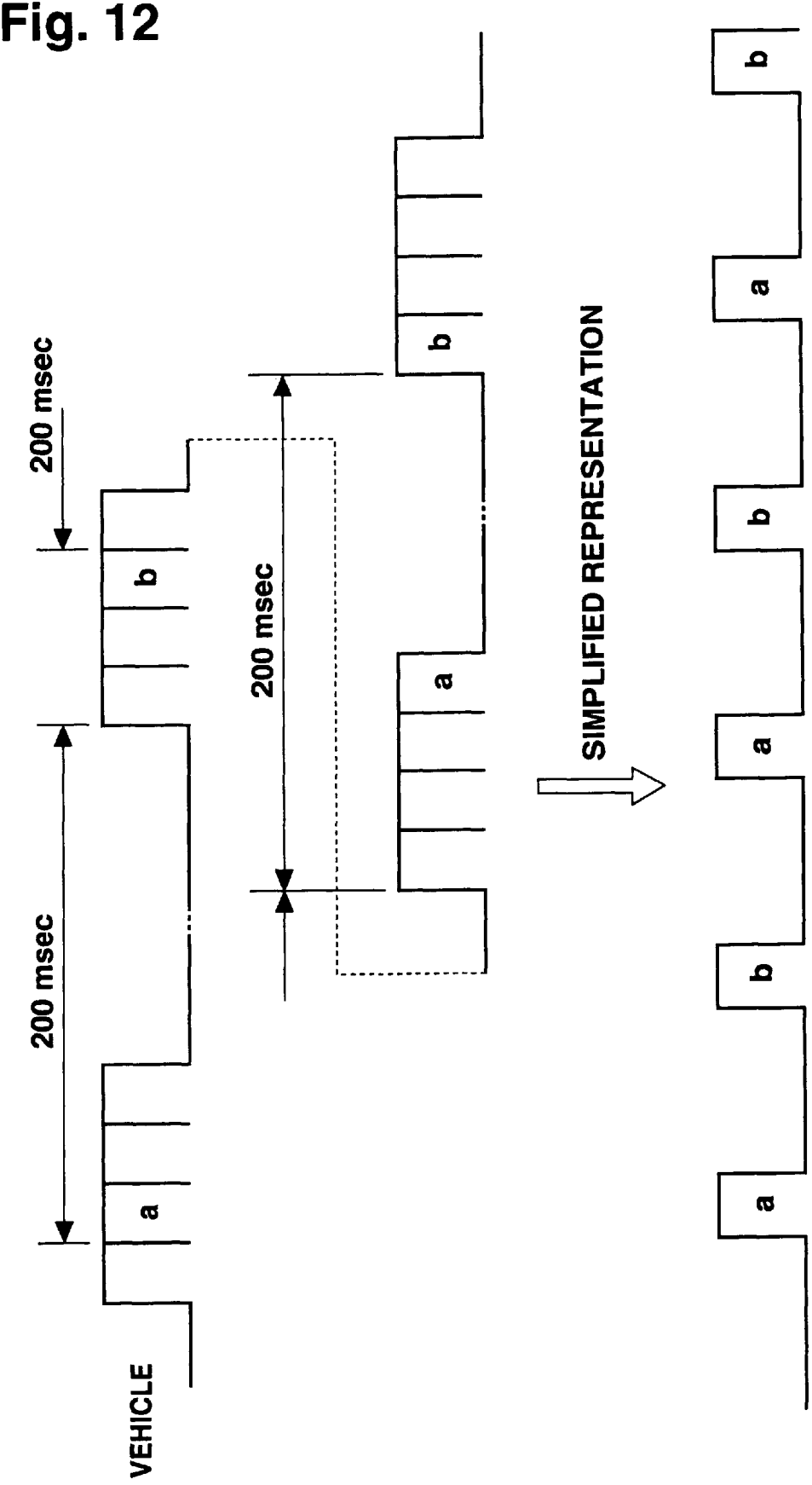
FIG. 12 is a chart showing timing of another example where an ID request signal is transmitted to a plurality of portable devices.

(ii) In the example described in (i) as above, the traffic for the ID request signal is simply doubled. When considering the human walking speed, on the other hand, even if the ID request signal is not transmitted every 200 msec, the user will not consider it strange if the checking is completed before the user reaches the outer door handle. Thus, as shown in FIG. 12, the ID request signals a and b can be alternately transmitted. In this case, the transmitting interval for each of the ID request signals a and b will be 400 msec.

Figure 13:
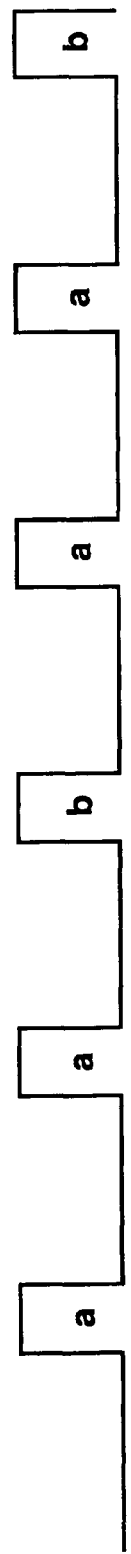
FIG. 13 is a chart showing timing of yet another example where an ID request signal is transmitted to a plurality of portable devices.

(iii) In the case of (ii) as described above, the ID request signals a and b are alternately transmitted. However, it is also possible to provide a learning function to the vehicle-side device so that the transmitting frequency is increased for the ID request signals for a portable device which is used more frequently. For example, when the ID request signal a is used more frequently, the ratio of the ID request signals a and b can be set at 2:1, as shown in FIG. 13. In this manner, depending on the user's usage tendencies, more preferable control of transmittance of ID request signal can be achieved.

Figure 14:
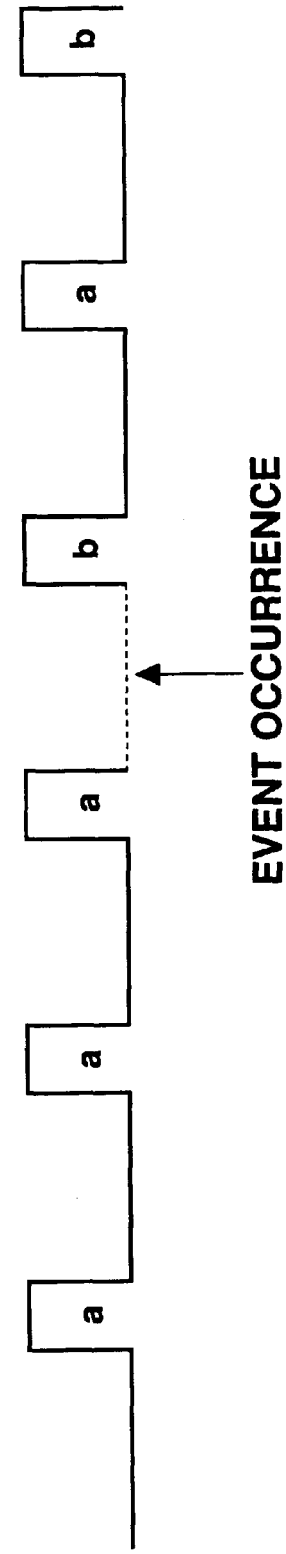
FIG. 14 is a chart showing timing of further example where an ID request signal is transmitted to a plurality of portable devices.

(iv) It is also possible to terminate transmission of an ID request signal for a portable device that is not used for a long period of time. For example, if the portable device b is not used for a long period of time, only ID request signal a is transmitted every time, as shown in FIG. 14. Thus, even when a person approaches the vehicle with the portable device b, release of the door lock etc. cannot be performed.

However, the portable device b is provided with a operating section 52 such as an unlock button. Here, by operating the operating section 52, an instruction is transmitted from the portable device b and the vehicle-side device performs unlocking etc., in response to the instruction. When such an operation is performed (an event occurs), transmission of the ID request signal b is restarted. In this manner, suitable transmission control for the ID request signals can be performed according to the user's usage tendency.

(v) Moreover, it is also possible to change the target that can be operated based on a portable device when a plurality of portable devices are present. The device in the present embodiment includes a second transmitting antenna 14 in the car that controls the permission/denial for starting the engine. In this case, the lock/release of the door can be operated by either of the portable devices a or b, but it is possible to configure the devices so that the engine start is only possible from the portable device a and not from the portable device b.

Figure 15:
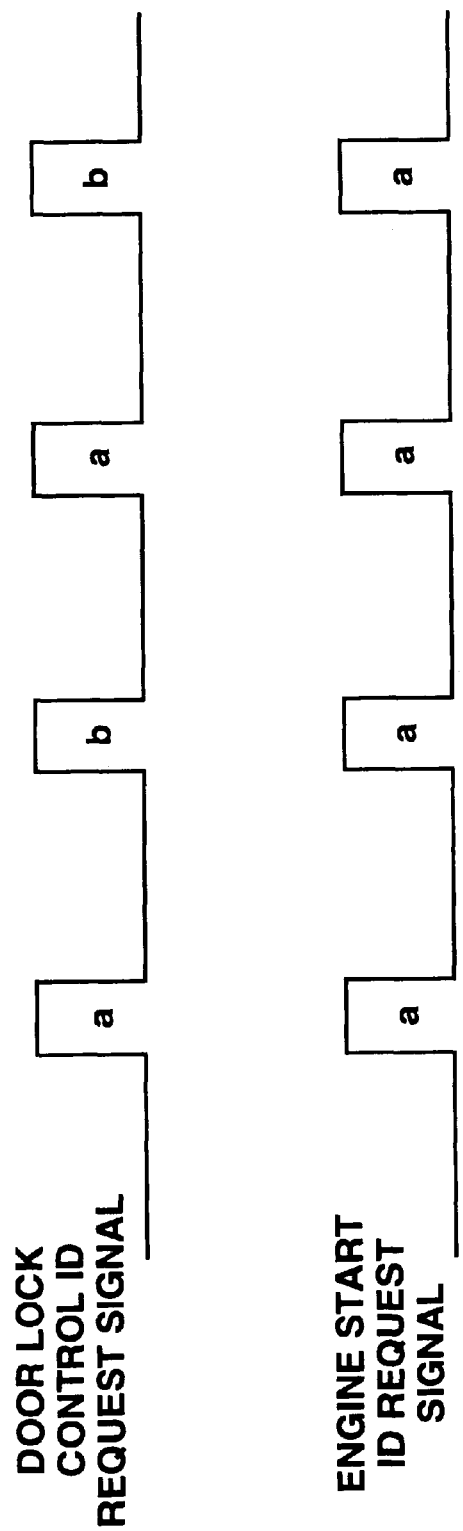
FIG. 15 is a chart showing timing of another example where an ID request signal is transmitted to a plurality of portable devices.

For this purpose, as shown in FIG. 15, the first transmitting antenna 10 transmits both ID request signals a and b alternately, but the second transmitting antenna 14 only transmits ID request signal a. Thus, the engine start permission can only be obtained for the portable device a. It is preferable to configure the device so that the engine start permission cannot be obtained for portable device B even through button operation at the portable device B.

In the above description, controls for door lock and for engine start are described, but similar distinction can be applied to the controls for other devices. For example, it is possible to limit functions for each portable device, such as a portable device a which can operate on every device of the vehicle and a portable device b which cannot open the trunk.

These settings can be stored in the memory 46, and the storing operation can be performed by a special device or at an on-vehicle device, but after inputting a predetermined password.

(vi) When a condition is repeated where the portable device responds to the ID request signal but the response trigger request is returned to "0" in the middle of the communication, it can be concluded that the request bit transmitted from the vehicle side is for the portable device, but the ID transmitted from the portable device is not registered at that vehicle. In this case, if the portable device continues to transmit, the battery of the portable device is wasted. It can also be concluded that there is a interfering wave of a frequency used for communication between the portable device and the vehicle (for example 300 MHz) and the communication between the portable device and the vehicle cannot be performed. In such a case, it is also wasteful to repeat communication.

When such conditions occur sequentially a plurality of times (for example, ten times), it is preferable for a sleep mode to be activated for the portable device and for the portable device to return no response. In this manner, wasteful communication can be prevented.

The portable device can return from the sleep mode by a number of ways including:

(a) automatic return after a predetermined time has elapsed; and (b) return after any button on the portable device is pushed.

"Others"

When communication is blocked by electric wave interference, operation will be slower than usual. Thus, it is preferable to notify the user about the communication blockage. For example, the user can be notified by a display on some kind of displaying panel or by sound.

As described, according to the present invention, by controlling the transmission of the ID request signal, a suitable countermeasure can be taken when electric wave interference occurs and the communication is blocked.

(Second Embodiment)

The structure of a device according to the second embodiment is basically equivalent to the structure for the first embodiment. The second embodiment relates to a defense against fraudulent attack by an attacker who tries to remotely operate by fraudulent communication.

Figure 16:
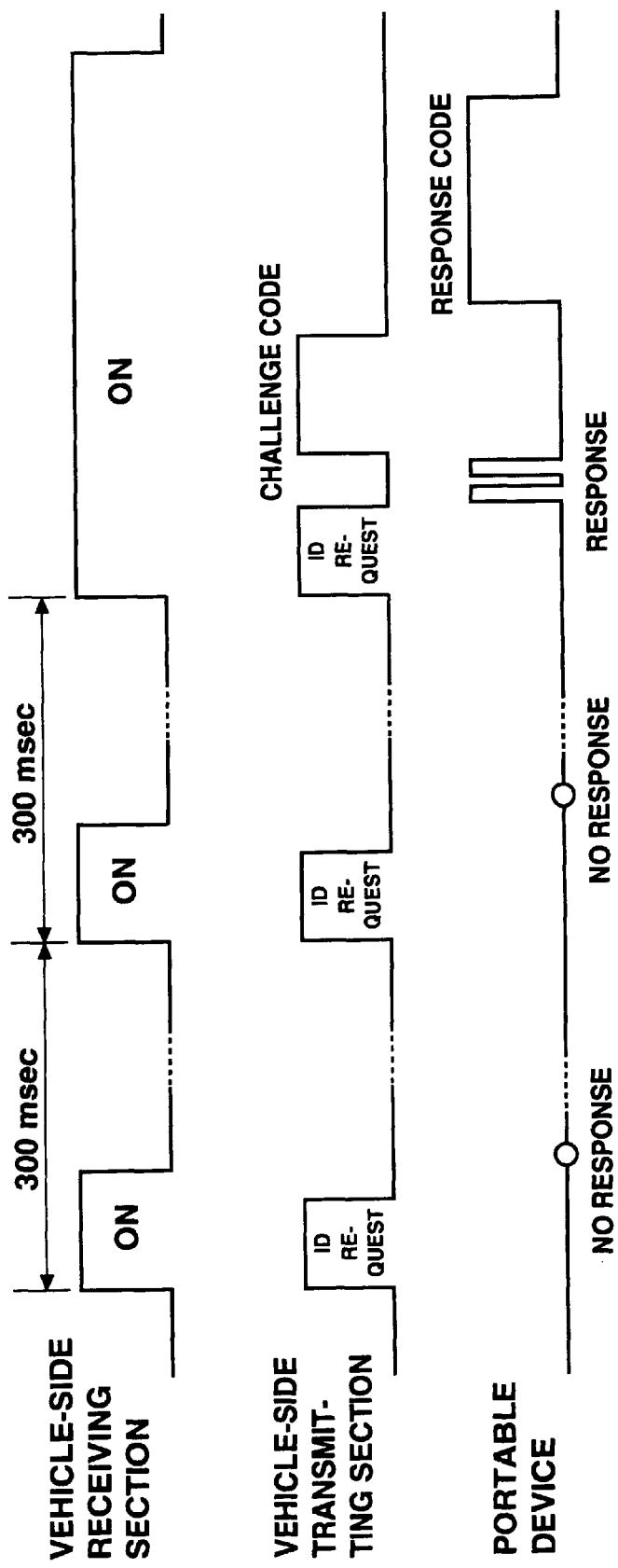
FIG. 16 is a chart showing timing of communication operation in a second embodiment.

As shown in FIG. 16, an ID request signal (12 bits) is transmitted from the first transmitting antenna 10 while the receiving section 20 is turned on. When there is no response, the receiving section 20 is turned off. When there is no response, this is repeated every 300 msec. The ID request signal from the first transmitting antenna is a car number for specifying the vehicle and only portable devices having that car number can respond.

When a portable device is present in an area in which the electric wave from the first transmitting antenna 10 can be received, the portable device returns a response. This response can be any response such as a burst signal, which notifies the vehicle-side that there was a response. When a response is received from the portable device, an internally generated challenge code (32 bits) is transmitted. This challenge code is a random number generated by a random number generator etc., and different codes are used every time.

At the portable device, when the challenge code is received, a predetermined functional calculation is performed based on the challenge code to produce a functional calculation bit. Then, a response code including the functional calculation bit is produced and returned.

The response code has a format such as the one shown in FIG. 17, and includes start bits (10 bits), a fixed ID code (32 bits), functional calculation bits (32 bits), status bits (5 bits), and parity bits (5 bits).

The start bits indicate the beginning of the response code. The fixed ID code is a code for specifying the portable device. The car number transmitted from the vehicle-side is for specifying the vehicle and if there are a plurality of portable devices for one vehicle, all the portable devices will respond. The portable device is specified by the fixed ID. The functional calculation bits are an encrypted code generated in a predetermined manner based on the received challenge code, as described above. The status bits indicate identification such as signals for smart entry or signals for locking/releasing due to pushing of the button at the portable device. The parity bits are data for checking whether there is an error in the response code.

In these response codes, when all data are correct, the vehicle determines that a proper portable device is approaching and releases the door lock.

An attacker who tries fraudulent attacks would imitate these communications. In order to do so, he would probably try to intercept the ID request signal transmitted from the vehicle and the response from the portable device.

The ID request signal is periodically transmitted, and therefore, it is easy to intercept the ID request signal. The response from the portable device can be intercepted by finding the user having the portable device and transmitting the ID request signal to the user.

When the response from the portable device is transmitted to the vehicle, the vehicle will generate a challenge code, which can then be intercepted by the attacker, but the challenge code is a random number which varies. If an attacker transmits a challenge code that is randomly selected to the user's portable device, the portable device would return a response. Thus, by receiving the response code, the attacker can obtain non-changing data, such as the start bit and fixed code, but because the functional bits are generated based on a random challenge code, it is difficult for the attacker to decode the function.

The attacker would then repeat transmission of the response code to the vehicle without the knowledge of the functional bits. If this attack is repeated every 300 msec, the attacker can repeat the trial 200 times in one minute and 2000 times in ten minutes.

The probability of a response code matching the proper code by this method will become very small if the number of bits in a challenge code is increased, but when the number of bits becomes too large, probability of an error being generated when a proper portable device is in communication will be increased, thus resulting in an inconvenient apparatus.

Therefore, it is preferable to prepare a preventive method for an attack by an attacker as described above.

Figure 18:
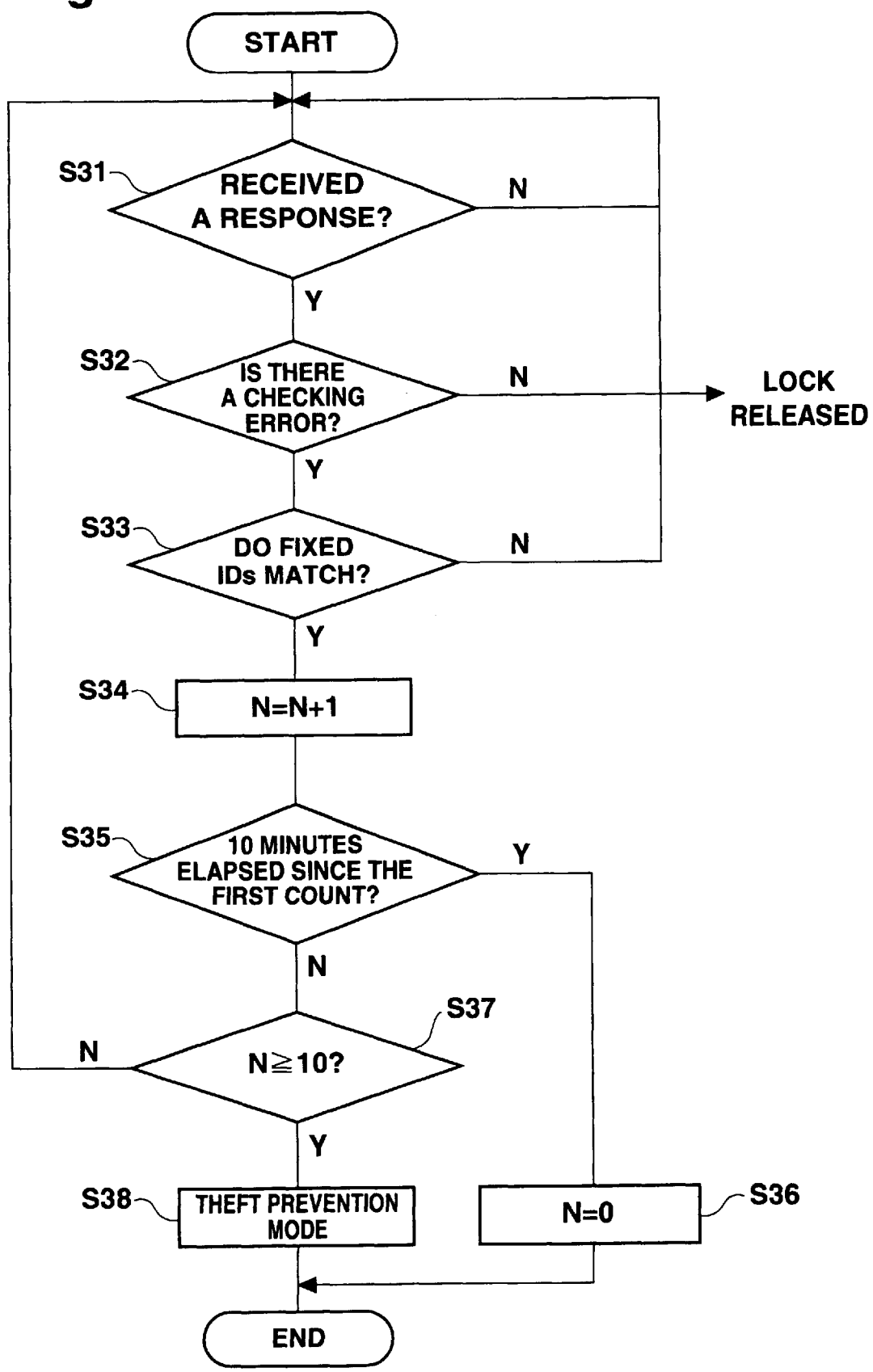
FIG. 18 is a flowchart showing a process to activate theft prevention mode.

In the present embodiment, as shown in FIG. 18, when the response code is received (step S31), it is determined if there is a checking error (step S32). When there is no error, it is determined that the portable device is genuine and the door lock is released. When there is a checking error, on the other hand, it is determined if the fixed codes match (step S33). If they do not match, then it is determined that a simple error has occurred and the procedure jumps back to step S31.

When the error occurs with a match in the fixed code, on the other hand, counter N is incremented by 1 (step S34). Then it is determined if 10 minutes has elapsed from the time when the counter is incremented first (step S35), and if 10 minutes has elapsed, N is reset to 0 (step S36).

If, on the other hand, 10 minutes has not elapsed, it is determined if N is greater than or equal to 10 (step S37). When this condition is satisfied in 10 minutes then a theft prevention mode is activated (step S38).

In this case, once the theft prevention mode is activated, the door lock is not released even when a correct response code is returned. Thus, releasing of the door lock by an attacker can be reliably prevented.

In the example, the theft prevention mode is activated after 10 errors in 10 minutes. This is because there are cases when the proper user is at the edge of the communication area and a communication error is generated.

Figure 19:
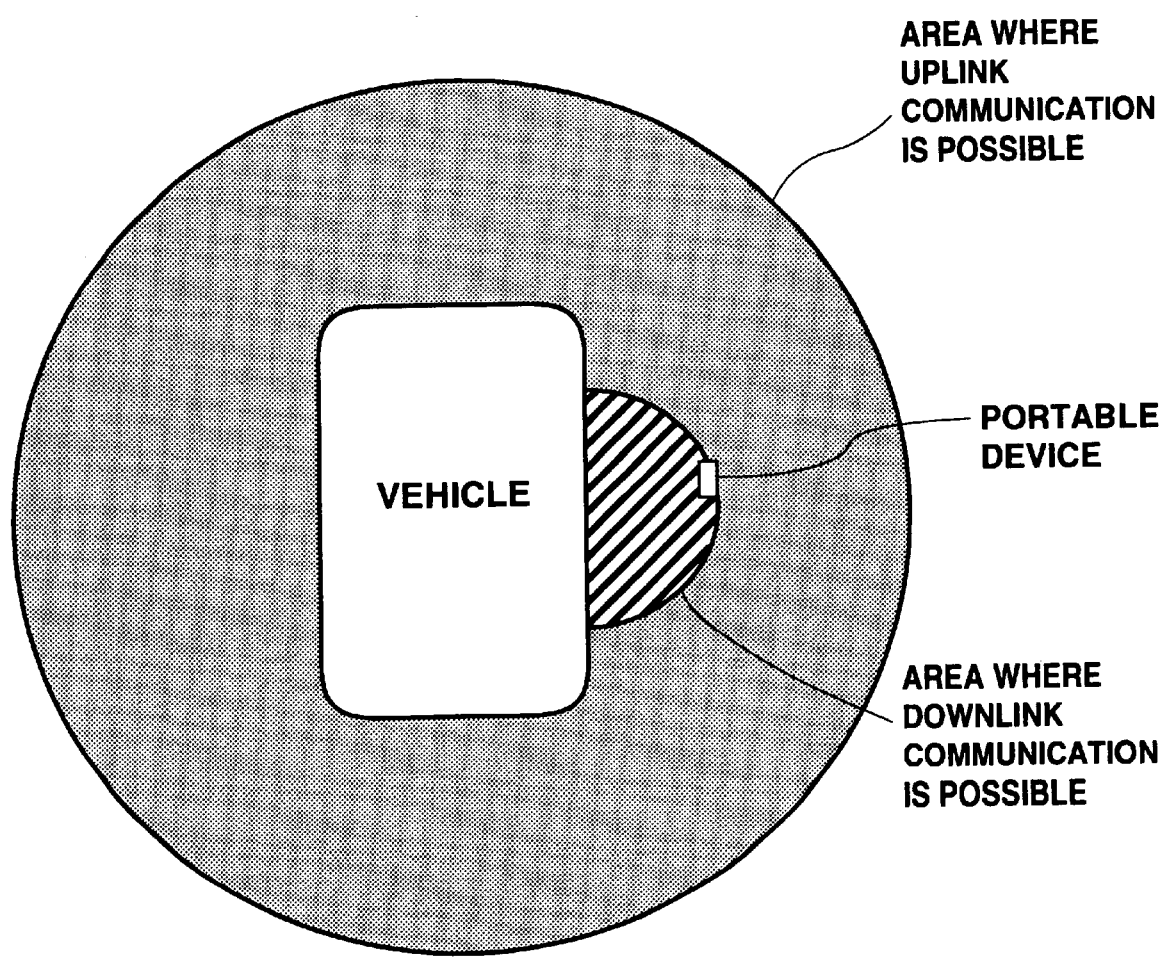
FIG. 19 is a diagram showing a communication area.

As shown in FIG. 19, when a communication error in a downlink code occurs in a situation where the area where uplink from the portable device to the vehicle can be performed is wider than the area where the ID request signal from the vehicle can communicate with the portable device, the challenge code cannot be properly received. The code returned from the portable device would have a matching fixed ID and error in the functional calculation code. Thus, even though this rarely happens, it is possible that the theft prevention mode will be activated even though a genuine portable device is used. Thus, the theft prevention mode is set to start after 10 error occurrences in 10 minutes, so that the theft prevention mode is not activated too easily.

When the theft prevention mode is activated, it is preferable to stop transmission of the ID request signal. By terminating transmission of the ID request signal, the vehicle does not turn on the receiving section for receiving the response code, and thus, an attack from an attacker can be prevented. Moreover, by terminating transmission of the ID request signal, battery consumption can be reduced.

This termination of transmission of the ID request signal can be realized as the same operation as the sleep mode during long-term parking.

It is preferable to employ any one of the following as a returning condition from the theft prevention mode as described above.

When a proper wireless code is received at the vehicle, the vehicle releases the door lock and returns from the theft prevention mode to the normal mode. The wireless code is a signal generated by a button operation on the portable device. The basic structure of the wireless code is equivalent to that of the response code as shown in FIG. 17. A rolling code is inserted in to the functional calculation bits, and identification data which is the wireless code is inserted at the status section.

The rolling code is a code which changes in a predetermined manner every time it is generated by pushing the button, and is changed, for example, by a predetermined function to the previous value. The vehicle-side holds the previously received rolling code and if the received rolling code matches a rolling code generated by pushing the button several times after the previous rolling code, the vehicle determines that it is a proper rolling code. The same calculation as that for the challenge code can be used as the functional calculation for the rolling code.

In this manner, the vehicle can determine whether the wireless code is proper by decoding the rolling code transmitted in a one-way transmission from the portable device. When a proper wireless code is transmitted, the vehicle determines that a proper user is using the portable device and returns from the theft prevention mode.

It is also possible to provide a sensor at the door handle. The vehicle can return from the theft prevention mode when the vehicle detects that a user is approaching. In this manner, a challenge code can be generated when a user having a proper portable device operates the door handle for opening the door, a response code can be generated from the portable device, and the door can be unlocked.

It is also possible to provide a switch etc. on the door handle. The vehicle can return from the theft prevention mode when detecting actual operation of the door handle. The switch in this case can be a mechanical switch, but in a door closer setting vehicle etc., the switch can electrically detect that the door is being pulled.

After such return from a theft prevention mode, the attacker can continue to repeat the attempts. However, the attacker must execute some operation such as pulling the handle, resulting in increases in labor and time requirements, and thus, actual continuous trials can substantially be stopped.

It is also preferable to notify the user about activation of the theft prevention mode when it is activated. In other words, when a vehicle returns through the above-mentioned conditions after a theft prevention mode is activated, the user would not know about the activation of the theft prevention mode. Therefore, it is preferable to notify the user by a display or a sound. In this manner, the user will know that the vehicle is targeted and know that it is dangerous at that parking lot and at that time of the day.

Figure 20:
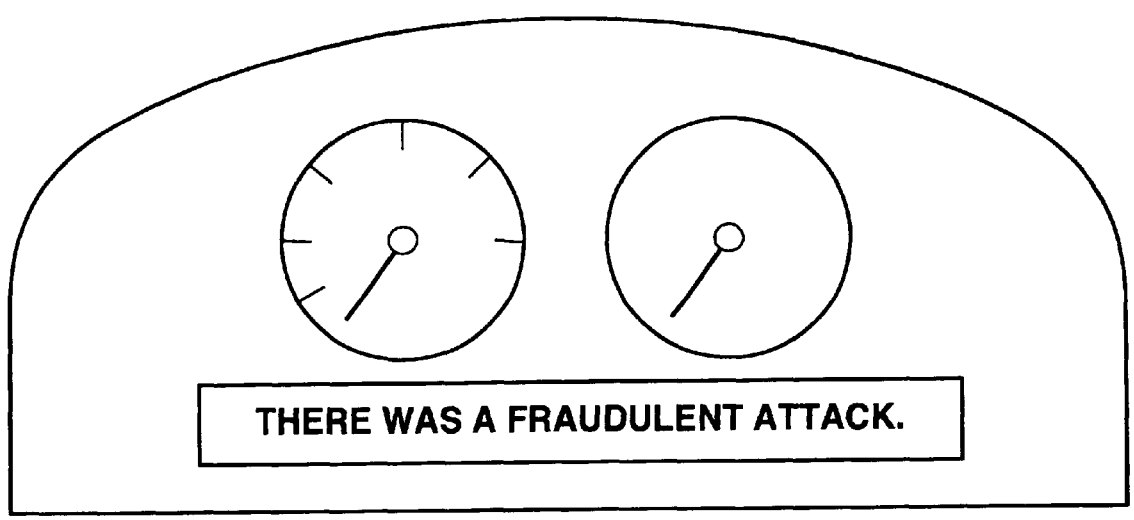
FIG. 20 is a diagram showing a display for a fraudulent attack.

One example of the display is shown in the FIG. 20, in which the alert is shown at the multi-information section of the meter indicator section. It is also preferable to display the alert on a navigational display or to output the alert as a guiding sound.

In the above example, the attacker transmitted an imitation response code in response to the ID request signal transmitted from the vehicle. However, the attacker may imitate, generate, and transmit the wireless code. In this case, a condition occurs where the fixed IDs match in the received data, but the rolling codes do not.

Thus, similar to the above case, it is preferable that the theft prevention mode is activated when such a condition is repeated 10 times in 10 minutes. The content of the theft prevention mode is equivalent to the above case.

Figure 21:
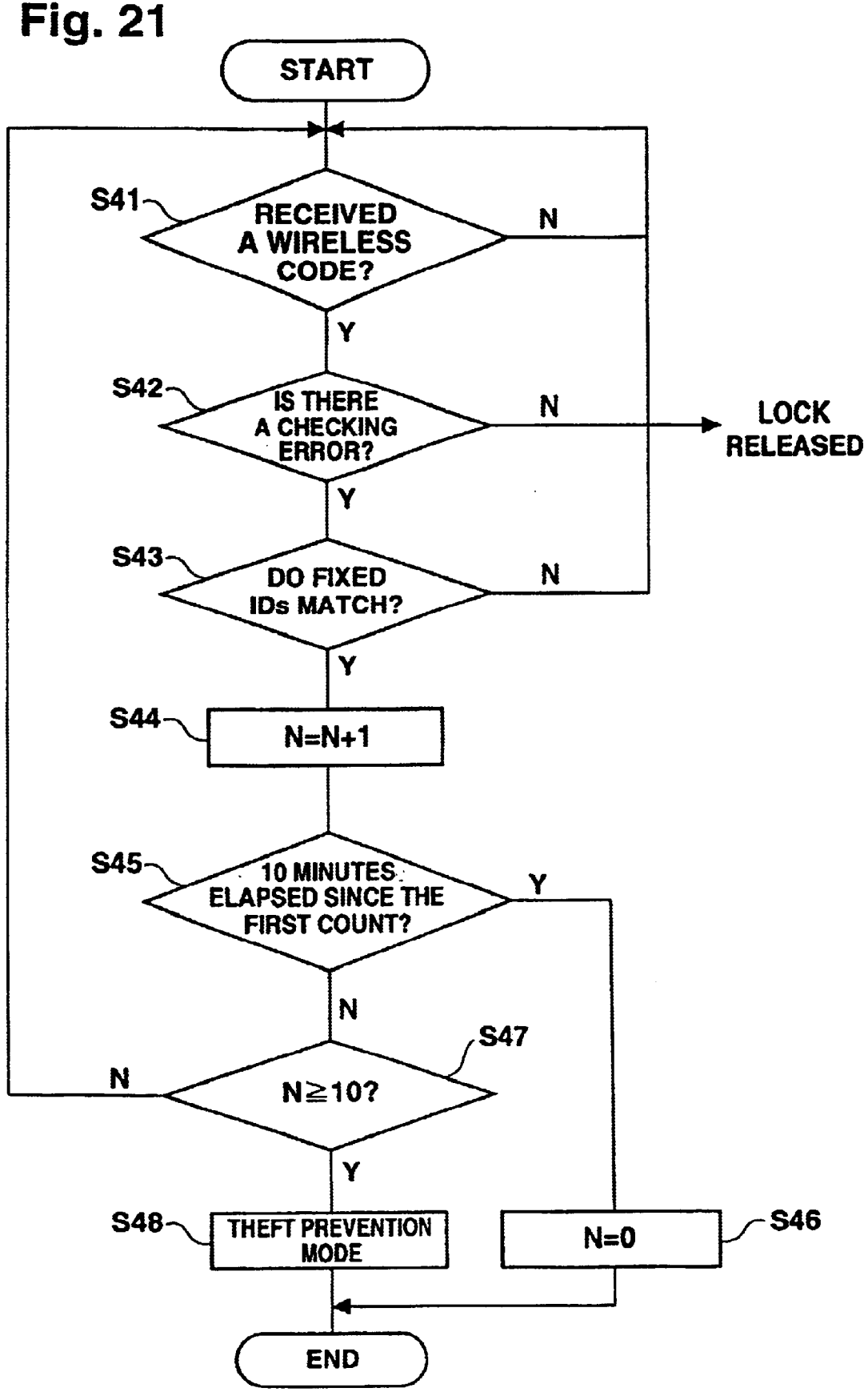
FIG. 21 is a flowchart showing a process to activate theft prevention mode.

Specifically, as shown in FIG. 21, when an asynchronous wireless code is received (step S41), it is determined if there is a checking error (step S42). When there is an error, then it is determined if the fixed codes match (step S43). If the fixed codes match, a counter N is incremented by 1 (step S44). It is determined if 10 minutes has elapsed since the first count (step S45), and N is reset to 0 when 10 minutes has elapsed (step S46). If N becomes greater than or equal to 10 within 10 minutes (step S47), the theft prevention mode is activated (step S48).

As described above, when an unusual condition occurs a predetermined number of times in a short period of time, where the fixed IDs match but not the functional calculation bits (or the rolling code) for the received signal, the theft prevention mode is activated. In this manner, an effective defense against an attack by an attacker can be achieved.

INDUSTRIAL APPLICABILITY

The on-vehicle device remote controller is mounted on a vehicle and used as a device for releasing the door lock of the vehicle etc., by communicating with a portable device carried by a user.

What is claimed is:

1. An on-vehicle device remote controller mounted on a vehicle for controlling operation of an on-vehicle device based on communication with a portable device, said controller comprising:
   an ID request signal transmitting device for intermittently transmitting ID request signals to the portable device with a predetermined period;
   ID receiving means for receiving an ID signal from said portable device;
   checking means for checking the ID received by the ID receiving means and a predetermined proper ID; and
   device operation control means for operating said predetermined on-vehicle device when checking is successful at the checking means;
   wherein, said transmission of the ID request signal:
      is controlled to be inhibited when checking fails at said checking means; and
      is achieved by elongating the interval between the intermittent ID request signals.

2. An on-vehicle device remote controller mounted on a vehicle for controlling operation of a predetermined on-vehicle device based on communication with a portable device, said controller comprising:
   ID request signal transmitting means for:
      transmitting a first ID request signal to the portable device at a first transmitting interval; and
      transmitting a second ID request signal to the portable device at a second transmitting interval, provided the first transmitting interval coincides with a transmitting interval of a co-located device;
   ID receiving means for receiving an ID signal from said portable device;
   checking means for checking the ID received at the ID receiving means with a predetermined proper ID; and
   device operation control means for operating the predetermined on-vehicle device when checking is successful at the checking means;
   wherein the transmission interval of the ID request signal at said checking means is sequentially changed in a predetermined manner;
   wherein transmission of the ID request signals is controlled to be inhibited when checking fails at said checking means; and
   wherein transmission of the ID request signals is achieved by elongating the interval between the first and second ID request signals.

3. A controller of claim 2, wherein, the checking means is disabled after a predetermined number of improper IDs are received by the ID receiving means in a predetermined period of time.

4. A controller of claim 2, wherein,
   ID request signal transmitting means transmits a car number determined for each vehicle, and when response is obtained for the transmission, transmits an ID request signal which is a random challenge code; and
   said checking means checks the response and the proper ID by determining whether a response code generated by a predetermined method based on the challenge code is included in the response from the portable device for the challenge code.

5. A controller of claim 4, wherein,
   said checking means decides checking failure when detecting a failure condition several times, said failure condition being a condition where the fixed code from the portable device is proper but the response code is not.

6. A controller of claim 2, further comprising a display means for displaying failure of checking when checking failed at said checking means.

7. An on-vehicle device remote controller mounted on a vehicle for controlling operation of a predetermined on-vehicle device based on communication with a plurality of portable devices, said controller comprising:
   ID request signal transmitting means for:
      intermittently transmitting at a first time interval, an ID request signal compatible with a first portable device; and
      intermittently transmitting at a second time interval, an ID request signal compatible with a second portable device;
      wherein an average of the first time interval decreases over time and an average of the second time interval increases over time as the frequency of use of the first device increases and the frequency of use of the second device decreases;
   ID receiving means for receiving ID signals from the first and second portable devices;
   checking means for checking the ID signals received at the ID receiving means with a predetermined proper ID; and
   device operation control means for operating the predetermined on-vehicle device when checking is successful at the checking means;
   wherein, the transmission interval of the ID request signal at said checking means is changed in a predetermined manner;
   wherein transmission of the ID request signal is controlled to be inhibited when checking fails at said checking means; and
   wherein transmission of the ID request signal is achieved by elongating the interval between intermittent ID request signals.

8. The controller of claim 7, wherein the average of the second time interval increases over time, provided the second portable device does not communicate with the on-vehicle device for a period of time.

9. An on-vehicle device remote controller mounted on a vehicle for controlling operation of a plurality of on-vehicle devices based on communication with a plurality of portable devices, said controller comprising:

ID request signal transmitting means for intermittently transmitting an ID request signal to the plurality of portable devices at a predetermined interval;

ID receiving means for receiving ID signals from the plurality of portable devices;

checking means for checking the ID signals received at the ID receiving means with a predetermined proper ID; and device operation control means for controlling operation of the plurality of on-vehicle devices when checking for a first one of the plurality of portable devices is successful at the checking means, and controlling operation of a subset of the plurality of on-vehicle devices when checking is successful for a second one of the plurality of portable devices at the checking means;

wherein the transmission interval of the ID request signal at said checking means is changed in a predetermined manner;

wherein transmission of the ID request signal is controlled to be inhibited when checking fails at said checking means; and wherein transmission of the ID request signal is achieved by elongating the interval between intermittent ID request signals.

* * * * *